(12) United States Patent
Mayo et al.

(10) Patent No.: US 12,039,180 B2
(45) Date of Patent: Jul. 16, 2024

(54) TEMPORARY SPARSE INDEX FOR A DEDUPLICATION STORAGE SYSTEM

(71) Applicant: HEWLETT PACKARD ENTERPRISE DEVELOPMENT LP, Houston, TX (US)

(72) Inventors: Richard Phillip Mayo, Bristol (GB); Aman Sahil, Bristol (GB); David Malcolm Falkinder, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 126 days.

(21) Appl. No.: 17/932,036

(22) Filed: Sep. 14, 2022

(65) Prior Publication Data

US 2024/0086098 A1    Mar. 14, 2024

(51) Int. Cl.
*G06F 3/06* (2006.01)

(52) U.S. Cl.
CPC .......... *G06F 3/0641* (2013.01); *G06F 3/0652* (2013.01); *G06F 3/0659* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 7,191,174 B2 | 3/2007 | Day et al. | |
| 8,799,238 B2 | 8/2014 | Eshghi et al. | |
| 8,935,487 B2 | 1/2015 | Sengupta et al. | |
| 2009/0113167 A1* | 4/2009 | Camble | G06F 11/1451 711/216 |
| 2011/0040763 A1* | 2/2011 | Lillibridge | G06F 11/1453 707/E17.089 |
| 2012/0143715 A1 | 6/2012 | Eshghi et al. | |
| 2013/0018855 A1* | 1/2013 | Eshghi | G06F 11/1453 707/E17.002 |

* cited by examiner

*Primary Examiner* — Yaima Rigol
(74) *Attorney, Agent, or Firm* — Trop, Pruner & Hu, P.C.

(57) ABSTRACT

Example implementations relate to deduplication operations in a storage system. An example includes, in response to initiation of a new backup process to store a first stream of data, initializing a temporary sparse index to be stored in a memory of a deduplication storage system; identifying a cloned portion of the first data stream; identifying at least one container index associated with the cloned portion of the first data stream; identifying a set of hook points included in the at least one container index; and populating the temporary sparse index with a set of entries, the set of entries mapping the identified set of hook points to the at least one container index.

20 Claims, 9 Drawing Sheets

TEMPORARY SPARSE INDEX FOR A DEDUPLICATION STORAGE SYSTEM

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

Figure 1:
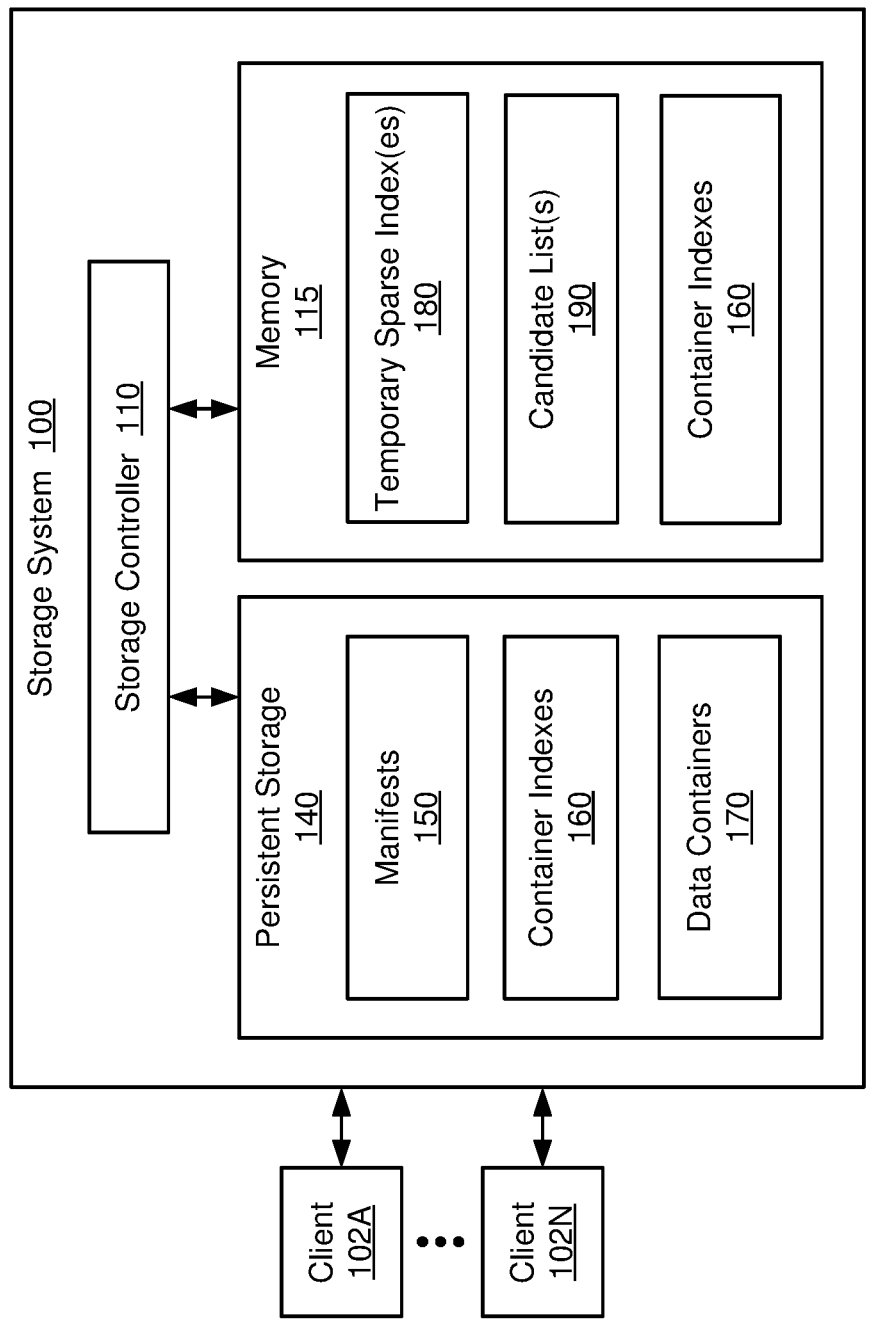
FIG. 1 is a schematic diagram of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may deduplicate data to reduce the amount of space required to store the data. The storage system may perform a deduplication process including breaking a stream of data into discrete data units (or "chunks") and determining "fingerprints" (described below) for these incoming data units. Further, the storage system may compare the fingerprints of incoming data units to fingerprints of stored data units, and may thereby determine which incoming data units are duplicates of previously stored data units (e.g., when the comparison indicates matching fingerprints). In the case of data units that are duplicates, the storage system may store references to previously stored data units instead of storing the duplicate incoming data units.

As used herein, the term "fingerprint" refers to a value derived by applying a function on the content of the data unit (where the "content" can include the entirety or a subset of the content of the data unit). An example of a function that can be applied includes a hash function that produces a hash value based on the content of an incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may use metadata for processing one or more inbound data streams (e.g., multiple concurrent inbound data streams). For example, such metadata may include data recipes (also referred to herein as "manifests") that specify the order in which particular data units are received (e.g., in a data stream). The processing of each data stream may be referred to herein as a "backup process." Subsequently, in response to a read request, the deduplication system may use a set of manifests to determine the received order of data units, and may thereby recreate the original data stream. Accordingly, the set of manifests may be a representation of the original data stream. The manifests may include a sequence of records, with each record representing a particular set of data unit(s). The records of the manifest may include one or more fields that identify indexes that include storage information for the data units. For example, a container index may include one or more fields that specify location information (e.g., containers, offsets, etc.) for the stored data units, compression and/or encryption characteristics of the stored data units, and so forth. The container index may include reference counts that indicate the number of manifests that reference each data unit. The metadata may be stored in persistent storage, but may be loaded into memory during use (e.g., when processing a data stream). Accordingly, the deduplication storage system may perform read input/output (I/O) operations to load the metadata from persistent storage to memory, and may perform write I/O operations to persist the metadata from memory to persistent storage.

In some examples, upon receiving a data unit (e.g., in a data stream), it may be determined whether an identical chunk is already stored in a container of the deduplication storage system. For example, the deduplication storage system may compare the fingerprint of the received data unit against the fingerprints in at least one container index. If no matching fingerprints are found in the searched container index(es), the received data unit may be added to a container, and an entry for the received data unit may be added to a container index corresponding to that container. However, if a matching fingerprint is found in a searched container index, it may be determined that a data unit identical to the received data unit is already stored in a container. In response to this determination, the reference count of the corresponding entry is incremented, and the received data unit is not stored in a container (as it is already present in one of the containers), thereby avoiding storing a duplicate data unit in the deduplication storage system. The process of comparing fingerprints of one or more received data units against fingerprints of one or more container indexes may be referred to herein as a "matching operation."

In some examples, the deduplication storage system may divide a received data stream into segments, with each segment including multiple data units. Further, prior to attempting to perform matching operations for all data units in a segment, the deduplication storage system may identify a set or list of container indexes (referred to herein as the "candidate list") to use for the matching operations for the data units in the segment. In some examples, the candidate list may be generated using a data structure (referred to herein as a "sparse index") that maps a relatively small subset of fingerprints (referred to herein as "hook points") to corresponding container indexes. For example, the hook points of incoming data units may be compared to the hook points in the sparse index, and each matching hook point may identify (i.e., is mapped to) a container index to be included in the candidate list.

In some examples, the deduplication storage system may execute multiple backup processes to receive and process backup information from multiple client applications. A client application may generate backup information as a combination of cloning commands and new data portions. Each cloning command may cause the deduplication storage system to make a copy of (i.e., "to clone") a portion of a data stream that has not changed since a previous backup. Further, the deduplication storage system may perform deduplication of the new data portions of the data stream (e.g., by performing a matching operation of the new data portions against one or more container indexes). As used herein, the term "cloned portions" may refer to the portions of the backup data stream that are stored in cloned form (i.e., using the cloning commands). Further, the term "new data portions" may refer to the remaining portions of the backup data stream that are stored in deduplicated form (i.e., without using cloning commands).

In some examples, the deduplication storage system may execute a cloning command by loading a source manifest for the particular data stream into memory, identifying a set of container indexes based on the source manifest, and loading the set of container indexes into memory. One of the container indexes loaded in memory may be updated to indicate the reference counts of the cloned data units (i.e., the number of instances that the data unit appears in manifests), and may be written from memory to persistent storage. The new manifest (i.e., representing the cloned data) may be formed from the components of the source manifest.

In some examples, the deduplication storage system may maintain a single sparse index for use across all backup processes. However, as the amount of data stored in the deduplication storage system increases, the number of hook points included in the stored data may also increase. As such, the size of the sparse index may become relatively large, and therefore may consume an excessive amount of space when loaded in memory. Accordingly, the amount of available memory may be insufficient to properly perform other processing tasks, and therefore the performance of the deduplication storage system may be reduced.

Further, when multiple backup processes are storing data on the deduplication storage system, the multiple processes may attempt to access and update the single sparse index at the same time. However, attempting to perform multiple concurrent accesses to the sparse index may result in problems such as data corruption, deadlock situations, and so forth. Accordingly, in such examples, the deduplication storage system may have to execute additional processes to prevent or manage the problems associated with performing multiple concurrent accesses to the single sparse index.

In accordance with some implementations of the present disclosure, a deduplication storage system may generate multiple temporary sparse indexes, with each temporary sparse index being used for a single backup process. The temporary sparse index may be generated based on the cloned portions of the backup data stream. For example, the temporary sparse index may include the hook points included in the cloned portions, and may map those hook points to the corresponding container indexes (i.e., the container indexes that include the hook points from the cloned portions). Further, in some implementations, the temporary sparse index may also map other hook points that are not included in the cloned portions, but are included in the corresponding container indexes. The temporary sparse index may be used to generate a candidate list of container indexes to match against the new data portions of the backup data stream. Further, the temporary sparse index may be deleted when the processing of the backup data stream is completed (i.e., all cloned portions and new data portions have been processed). In this manner, some implementations may allow the deduplication storage system to use multiple temporary sparse indexes of relatively smaller sizes, instead of using a single persistent sparse index of a relatively large size. Accordingly, some implementations may reduce the amount of memory required to load a sparse index to generate a candidate list, and may thereby improve the performance of the deduplication storage system. The disclosed technique for generating the temporary sparse indexes is discussed further below with reference to FIGS. 1-8.

FIG. 1—Example Storage System

FIG. 1 shows an example of a storage system 100 that includes a storage controller 110, memory 115, and persistent storage 140, in accordance with some implementations. The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM). In some examples, the storage controller 110 may be implemented via hardware (e.g., electronic circuitry) or a combination of hardware and programming (e.g., comprising at least one processor and instructions executable by the at least one processor and stored on at least one machine-readable storage medium).

As shown in FIG. 1, the persistent storage 140 may store various data structures including at least manifests 150, container indexes 160, data containers 170, and journal groups 120. Further, the memory 115 may store various data structures including at least container indexes 160, journal groups 120, temporary sparse index(es) 180, and candidate list(s) 190. In some examples, copies of the container indexes 160 and the journal groups 120 may be transferred between the memory 115 and persistent storage 140 (e.g., via read and write input/output (I/O) operations).

In some implementations, the storage controller 110 may execute multiple backup processes to receive and process backup information from multiple client applications 102A-102N (also referred to herein as "client applications 102"). For example, a client application 102 may generate cloning commands to clone portions of the backup data stream that have not changed since a previous backup of the data stream. Further, the client application 102 may transmit new data (i.e., non-cloned) portions of the backup data stream that include at least some changes from the previous backup of the data stream.

In some implementations, the storage controller 110 may perform deduplication of the new data portions received from a client application 102. For example, the storage controller 110 may receive new data units from a client application 102, and may store at least one copy of each new data unit in a data container 170 (e.g., by appending the data units to the end of the data container 170).

In one or more implementations, the storage controller 110 may generate a fingerprint for each new data unit. For example, the fingerprint may include a full or partial hash value based on the data unit. To determine whether a received data unit is a duplicate of a stored data unit, the storage controller 110 may perform a matching operation (i.e., comparing the fingerprint generated for the incoming data unit to the fingerprints in at least one container index). If a match is identified, then the storage controller 110 may determine that a duplicate of the incoming data unit is already stored by the storage system 100. The storage controller 110 may then store references to the previous data unit, instead of storing the duplicate incoming data unit.

In some implementations, the storage controller 110 may also receive cloning commands from multiple client applications 102. The cloning commands may identify portions of a particular data stream that have not changed since a previous backup. The storage controller 110 may execute a cloning command by loading a source manifest 150 for the particular data stream into the memory 115, identifying a set of container indexes 160 based on the source manifest 150, and loading the set of container indexes 160 into the memory 115. The container indexes 160 loaded in memory 115 may be updated to indicate the reference counts of the cloned data units (i.e., the number of instances that the data unit appears in manifests).

In some implementations, the storage controller 110 may generate a new manifest 150 to record the order of the new data units (in the non-cloned portions) and the cloned data units (in the portions copied by the cloning commands) of the backup data stream. The new manifest 150 may include a pointer or other information indicating the container index 160 that is associated with each data unit. In some implementations, the associated container index 160 may indicate the location in which the data unit is stored. For example, the associated container index 160 may include information specifying that the data unit is stored at a particular offset in an entity, and that the entity is stored at a particular offset in a data container 170. Further, the container index 160 may include reference counts that indicate the number of manifests 150 that reference each data unit. In some implementations, for each cloned portion, the new manifest 150 may include a duplicate of the portion of a source manifest 150 that represents the cloned portion.

In some implementations, the storage controller 110 may receive a read request to access the stored data, and in response may access the new manifest 150 to determine the sequence of data units that made up the original data. The storage controller 110 may then use pointer data included in the new manifest 150 to identify the container indexes 160 associated with the data units. Further, the storage controller 110 may use information included in the identified container indexes 160 (and information included in the new manifest 150) to determine the locations that store the data units (e.g., data container 170, entity, offsets, etc.), and may then read the data units from the determined locations.

In some implementations, each journal group 120 may be a data structure grouping multiple journals 130. Each journal 130 may be a data structure associated with a corresponding container index 160. Further, each journal 130 may include information indicating changes to the data stored in the container index 160 associated with that journal 130. For example, when a copy of the container index 160 present in memory 115 is modified to reflect a change to the metadata, that change may also be recorded as an entry in the associated journal 130. In some implementations, multiple journals 130 may be grouped in a journal group 120 associated with a single file or object stored in the deduplication system. For example, the multiple journals may correspond to indexes storing metadata associated with a single file.

In some implementations, each temporary sparse index 180 may be a data structure including multiple entries or rows. Each entry of the temporary sparse index 180 may map the fingerprint of a data unit to a data container 170 that includes a stored version of that data unit. For example, each entry may include some or all of a fingerprint (e.g., a full hash, a truncated hash, etc.) of the data unit. Further, each entry may include an identifier for a data container 170, and/or an identifier for a container index 160 associated with the data container 170. In examples described herein, each temporary sparse index 180 may contain entries for a subset of fingerprints defined by a sparse fingerprint condition. As used herein, the term "hook points" refers to the subset of fingerprints that meet the sparse fingerprint condition. In some examples, the sparse fingerprint condition may be a condition that is met by a relatively small number of all of the possible fingerprints. For example, the sparse fingerprint condition may be whether a given fingerprint (e.g., in a binary representation) includes a particular bit pattern at a particular offset.

In some implementations, the storage controller 110 may generate a temporary sparse index 180 for use by a single backup process. The entries of the temporary sparse index 180 may be populated with the hook points that are associated with the cloned portions (i.e., the portions copied by the cloning commands) of the backup data stream. For example, the storage controller 110 may generate fingerprints for the data units included in a cloned portion, and may identify a first set of hook points included in the generated fingerprints (i.e., the fingerprints that satisfy a sparse condition). The storage controller 110 may then determine a first set of container indexes 160 that include the first set of hook points, and may populate the temporary sparse index 180 to map the first set of hook points to their corresponding container indexes 160. For example, each entry of the temporary sparse index 180 may identify a different hook point, as well as the container index 160 that includes that hook point. Further, in some implementations, the storage controller 110 may identify a second set of hook points that are also included in the first set of container indexes 160 (i.e., hook points different from the first set of hook points for the data units included in a cloned portion). The storage controller 110 may then populate the temporary sparse index 180 to also map the second set of hook points to their corresponding container indexes 160. An example process for generating the temporary sparse index 180 is discussed below with reference to FIGS. 3-4.

In some implementations, each temporary sparse index 180 may be used to generate a candidate list 190 for use with a particular backup data stream. The candidate list 190 may list candidate container indexes according to a decreasing order of the predicted number of matches to be found in each candidate container index for the new data portion. The storage controller 110 may perform matching operations of the new data units against the candidate container indexes according to the order of the candidate list 190. An example process for performing a matching operation is discussed below with reference to FIG. 5. In some implementations, the temporary sparse index 180 may be deleted after the processing of the backup data stream is completed (i.e., after all cloned and non-cloned portions have been processed).

In some implementations, the storage controller 110 may identify hook points in a new data portion (e.g., received from a client application 102) based on a sparse fingerprint condition. The hook points of a received new data portion may be compared to the hook points stored in the temporary sparse index 180 (i.e., the first and second sets of hook points determined from the cloned portions). If a hook point of the received new data portion is matched to an entry of the temporary sparse index 180, that entry may be used to identify a container index 160 that indicates the stored location of the associated data unit. The candidate list 190 may then be generated from the container indexes 160 that are identified using the temporary sparse index 180. In some implementations, if a hook point of the received new data portion is not included in the temporary sparse index 180, that hook point may be added to the temporary sparse index 180. For example, a new entry may be added to the temporary sparse index 180 to identify the hook point and an associated data container 170 (or the associated container index 160).

In some implementations, when comparing the hook points of a new data portion to the temporary sparse index 180, multiple hook points may map to the same container index 160. Therefore, some candidate container indexes 160 may be identified multiple times based on the comparison to the temporary sparse index 180. The storage controller 110 may count the number of hook points in a segment that match a given container index 160 based on the temporary sparse index 180. In some implementations, the candidate list 190 may be sorted in descending order of hook points (i.e., the number of hook points mapped to a given candidate container indexes 160 based on the temporary sparse index 180). As such, the candidate list 190 may begin with the candidate container index 160 that is likely to match the largest number of data units, and may end with the candidate container index 160 that is likely to match the smallest number of data units.

In some implementations, the storage controller 110 may use the candidate list 190 to perform matching of a received new data portion. For example, the storage controller 110 may iteratively load each candidate container index 160 into memory 115 (if not already included in memory 115) in the order of the candidate list 190. The storage controller 110 may generate a fingerprint for each data unit of the received new data portion, and may compare the generated fingerprint to the fingerprints included in the current container index 160. If a match is identified, then the storage controller 110 may determine that a duplicate of the data unit is already stored by the storage system 100. Accordingly, the storage controller 110 may store a reference to the previous data unit (e.g., in a manifest 150) in deduplicated form, rather than storing a new copy of the incoming data unit. In some implementations, loading the candidate container indexes 160 into memory 115 according to the order of the candidate list 190 (i.e., in descending order of the number of hook points) may allow the largest number of fingerprint matches to occur as early as possible in the matching process, and therefore may reduce the overall time required for the matching process. Accordingly, use of the candidate list 190 may provide improved efficiency for the matching process.

Figure 2:
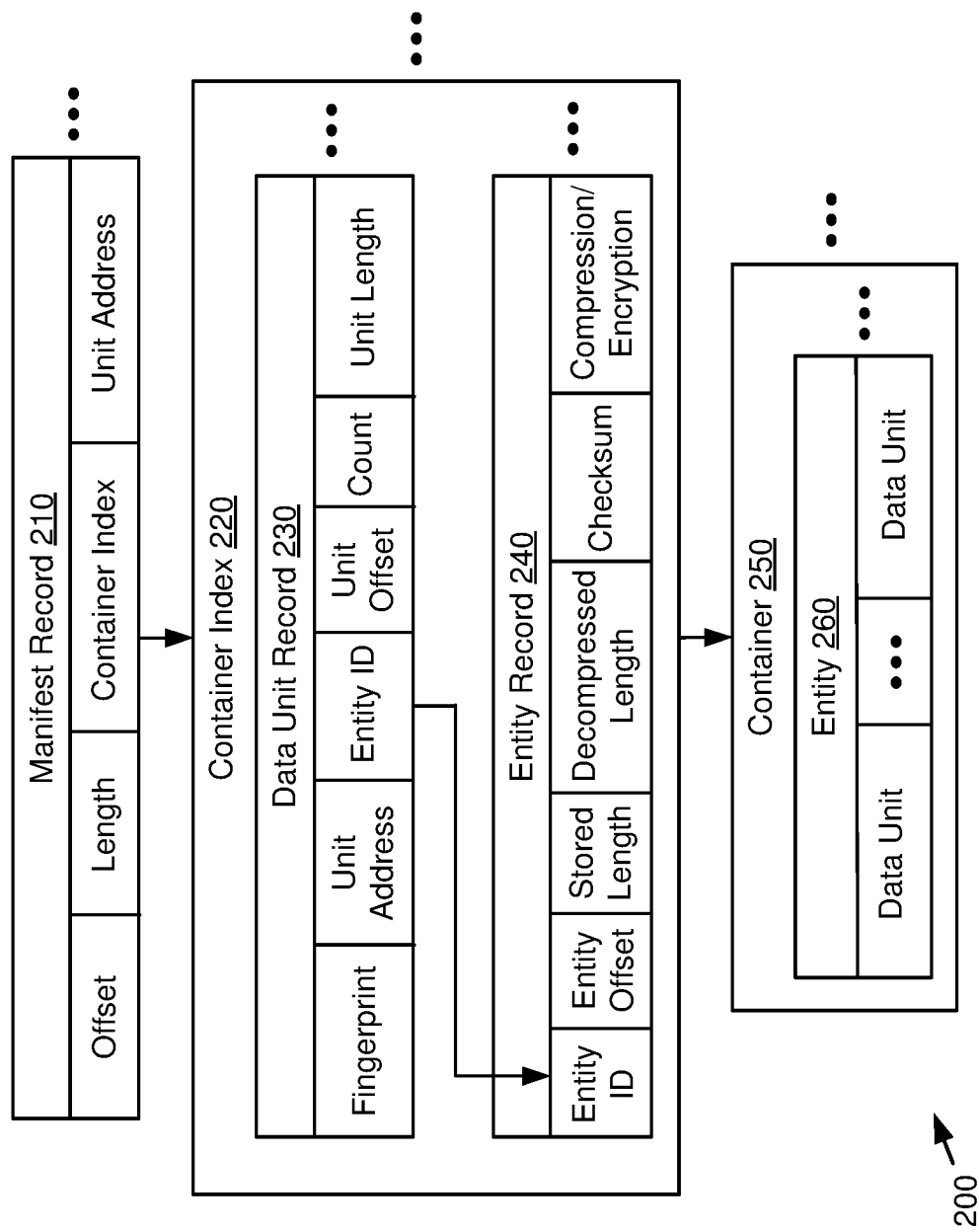
FIG. 2 is an illustration of example data structures, in accordance with some implementations.

FIG. 2—Example Data Structures

Referring now to FIG. 2, shown is an illustration of example data structures 200 used in deduplication, in accordance with some implementations. As shown, the data structures 200 may include a manifest record 210, a container index 220, and a container 250. In some examples, the manifest record 210, the container index 220, and the container 250 may correspond generally to example implementations of a manifest 150, a container index 160, and a data container 170 (shown in FIG. 1), respectively. In some examples, the data structures 200 may be generated and/or managed by the storage controller 110 (shown in FIG. 1).

As shown in FIG. 2, in some examples, the manifest record 210 may include various fields, such as offset, length, container index, and unit address. In some implementations, each container index 220 may include any number of data unit record(s) 230 and entity record(s) 240. Each data unit record 230 may include various fields, such as a fingerprint (e.g., a hash of the data unit), a unit address, an entity identifier, a unit offset (i.e., an offset of the data unit within the entity), a reference count value, and a unit length. In some examples, the reference count value may indicate the number of manifest records 210 that reference the data unit record 230. Further, each entity record 240 may include various fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each container 250 may include any number of entities 260, and each entity 260 may include any number of stored data units.

In one or more implementations, the data structures 200 may be used to retrieve stored deduplicated data. For example, a read request may specify an offset and length of data in a given file. These request parameters may be matched to the offset and length fields of a particular manifest record 210. The container index and unit address of the particular manifest record 210 may then be matched to a particular data unit record 230 included in a container index 220. Further, the entity identifier of the particular data unit record 230 may be matched to the entity identifier of a particular entity record 240. Furthermore, one or more other fields of the particular entity record 240 (e.g., the entity offset, the stored length, checksum, etc.) may be used to identify the container 250 and entity 260, and the data unit may then be read from the identified container 250 and entity 260.

Figure 3:
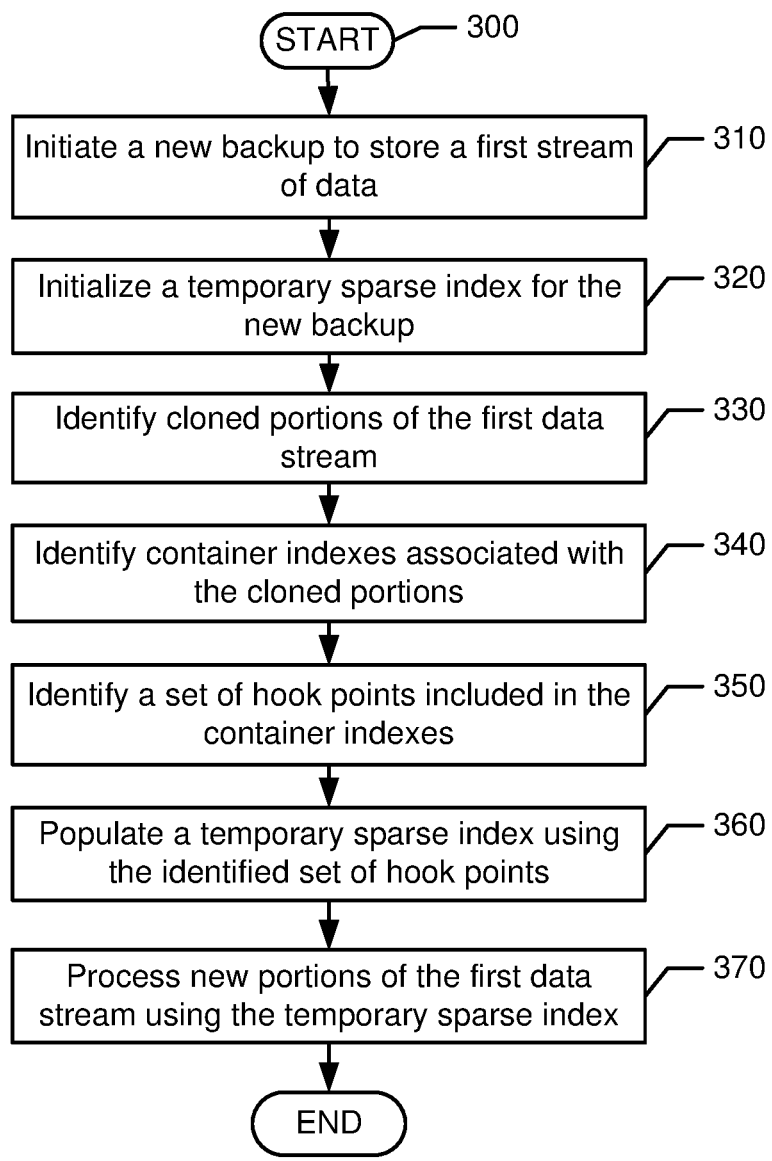
FIG. 3 is an illustration of an example process, in accordance with some implementations.
Figure 4:
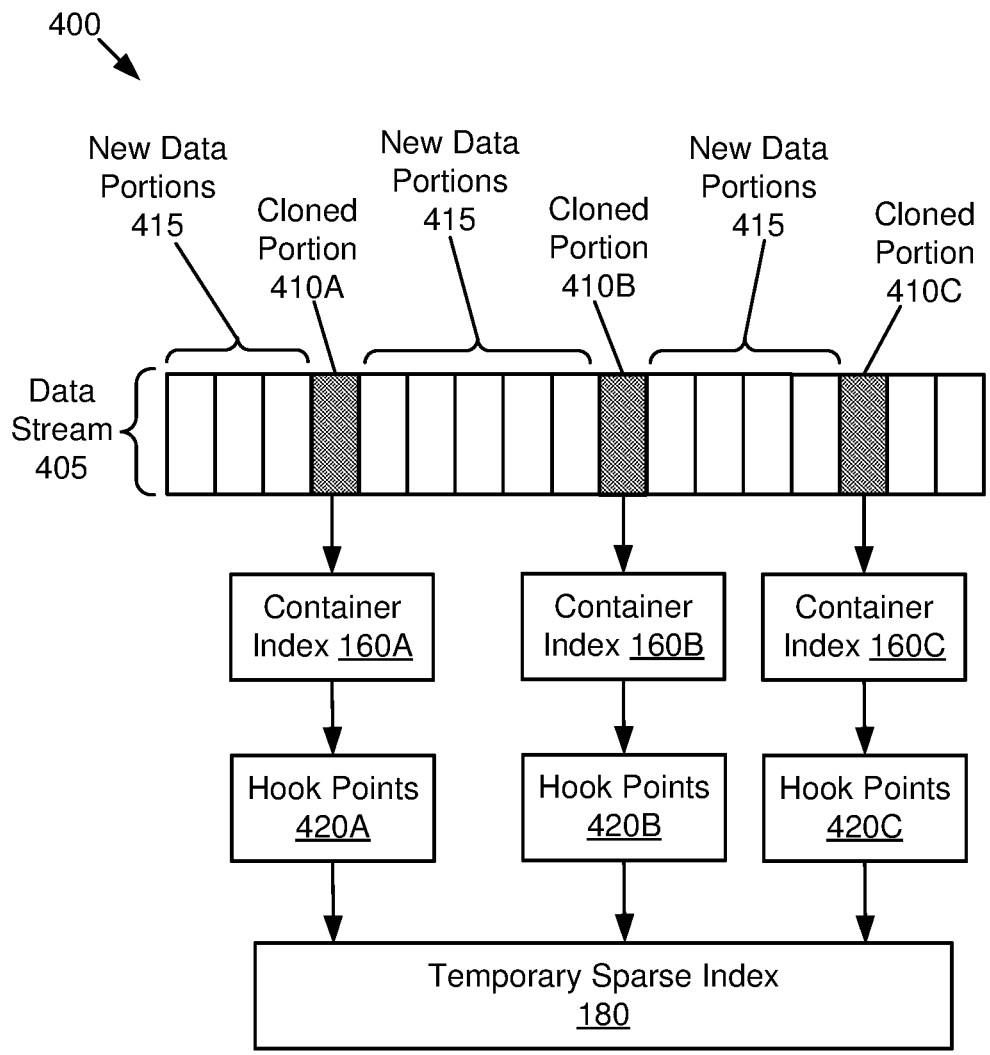
FIG. 4 is an illustration of an example operation, in accordance with some implementations.

FIGS. 3-4—Example Process for Generating a Temporary Sparse Index

FIG. 3 shows is an example process 300 in accordance with some implementations. For the sake of illustration, details of the process 300 may be described below with reference to FIG. 4, which shows an example operation 400 in accordance with some implementations. However, other implementations are also possible. In some examples, the process 300 may be performed using the storage controller 110 (shown in FIG. 1). The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 310 may include initiating a new backup to store a first stream of data. Block 320 may include initializing a temporary sparse index for the new backup. For example, referring to FIGS. 1 and 4, the storage controller 110 receives backup information from a client application 102. The backup information represents a data stream 405 to be stored as a backup in the deduplication storage system 100. In response to the initiation of the new backup, the storage controller initializes the temporary sparse index 180 to be used solely for processing the new backup.

Block 330 may include identifying cloned portions of the first data stream. For example, referring to FIGS. 1 and 4, the backup information (received by the storage controller 110 from the client application 102) includes cloning commands to clone portions 410A-410C of the backup data stream 405 that have not changed since a previous backup of the data stream. Further, the backup information also includes new data portions 415 (i.e., non-cloned portions) of the backup data stream that include at least some changes from the previous backup of the data stream. In the example of FIG. 4, the cloned portions 410A-410C are shown with shading, and the new data portions 415 are shown without shading.

Block 340 may include identifying container indexes associated with the cloned portions. For example, referring to FIGS. 1 and 4, the storage controller 110 loads a first source manifest for a first cloned portion 410A into memory, and uses the first source manifest to identify a first container index 160A. Further, the storage controller 110 loads a second source manifest for a second cloned portion 410B into memory, and uses the second source manifest to identify a second container index 160B. Furthermore, the storage controller 110 loads a third source manifest for a third cloned portion 410C into memory, and uses the third source manifest to identify a third container index 160C that includes the identified hook points. Note that, while FIG. 4 shows that a single container index 160 is identified for each cloned portion 410 for the sake of simplicity, implementations are not limited in this regard. For example, it is contemplated that multiple container indexes 160 may be identified for each cloned portion 410. Stated differently, the fingerprints for the data units in a cloned portion 410 may be stored in multiple container indexes 160.

Block 350 may include identifying a set of hook points included in the container indexes. Block 360 may include populating a temporary sparse index using the identified set of hook points. For example, referring to FIGS. 1 and 4, the storage controller 110 identifies hook points 420A from the first container index 160A. In some implementations, the hook points 420A include all hook points included in the first container index 160A. However, in other implementations, the hook points 420A only include a subset of hook points in the container index 160A that are also included in the first cloned portion 420A. The storage controller 110 then populates the temporary sparse index 180 with entries mapping the hook points 420A to the first container index 160A. Further, the storage controller 110 identifies hook points 420B from the second container index 160B, and populates the temporary sparse index 180 with entries mapping the hook points 420B to the second container index 160B. Furthermore, the storage controller 110 identifies hook points 420C from the third container index 160C, and populates the temporary sparse index 180 with entries mapping the hook points 420C to the third container index 160C.

Block 370 may include processing new portions of the first data stream using the temporary sparse index. After block 370, the process 300 may be completed. For example, referring to FIGS. 1 and 4, the storage controller 110 uses the temporary sparse index 180 to generate a candidate list 190. An example process for generating the candidate list 190 is discussed below with reference to FIG. 5. The candidate list 190 may specify a set of candidate container indexes according to a decreasing order of the predicted number of matches to be found in each candidate container index for a new data portion 415. The storage controller 110 may perform matching operations of the new data units against the candidate container indexes according to the order of the candidate list 190. In some implementations, the temporary sparse index 180 may be deleted after the processing of the backup data stream is completed (i.e., after all cloned portions 410A-410C and new data portions 415 have been processed).

Figure 5:
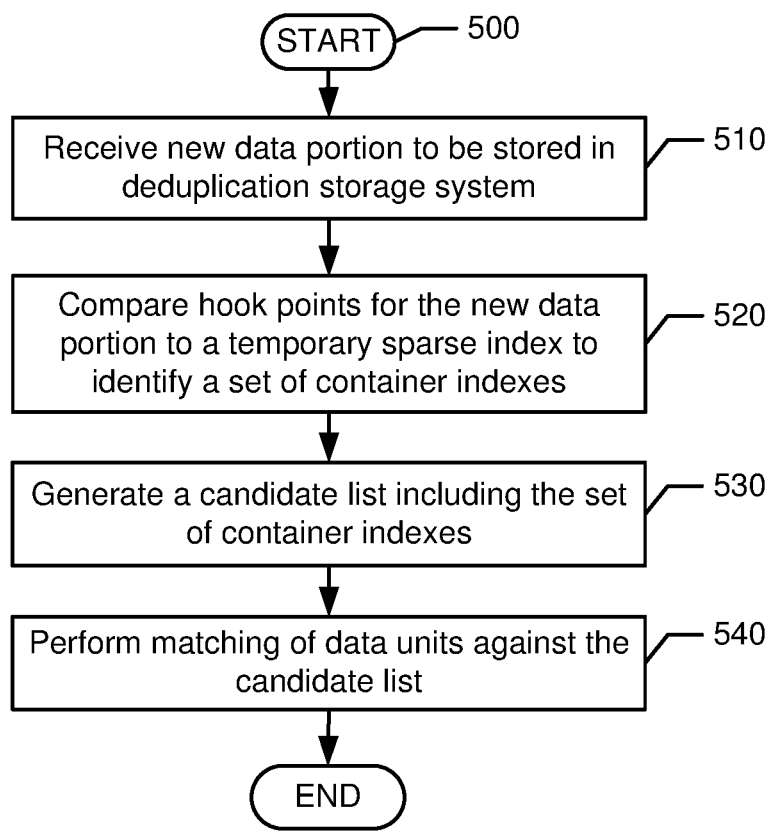
FIG. 5 is an illustration of an example process, in accordance with some implementations.

FIG. 5—Example Process for Data Deduplication

FIG. 5 shows is an example process 500 for data deduplication, in accordance with some implementations. In some examples, the process 500 may be performed using the storage controller 110 (shown in FIG. 1). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 500 may be described below with reference to FIGS. 1-4, which show examples in accordance with some implementations. However, other implementations are also possible.

Block 510 may include receiving a new data portion to be stored in deduplication storage system. For example, referring to FIGS. 1 and 4, the storage controller 110 receives (e.g., from a client application 102) a new data portion 415 of a backup data stream.

Block 520 may include comparing hook points for the new data portion to a temporary sparse index to identify a set of container indexes. Block 530 may include generating a candidate list including the set of container indexes. For example, referring to FIGS. 1 and 4, the storage controller 110 generates fingerprints for the data units included in a new data portion 415, and identifies a set of hook points (referred to herein as "new data hook points") included in these fingerprints (e.g., the fingerprints that satisfy a sparse fingerprint condition or algorithm). The storage controller 110 compares the new data hook points to the hook points stored in a temporary sparse index 180, and thereby identifies one or more matching hook points (i.e., the new data hook points that are also included in the temporary sparse index 180). The storage controller 110 then generates a candidate list 190 that lists each container index 160 that is mapped in the temporary sparse index 180 to at least one matching hook point. The container indexes 160 listed in the candidate list 190 may be referred to herein as the "candidate container indexes 160." Further, the storage controller 110 counts the number of hook points that are mapped to each candidate container index 160, and sorts the candidate container indexes 160 in the candidate list 190 by decreasing number of matching hook points.

Block 540 may include performing matching of data units against the candidate list. After block 540, the process 500 may be completed. For example, referring to FIGS. 1 and 4, the storage controller 110 iteratively processes each container index 160 included in the candidate list 190. For each iteration, the storage controller 110 matches the data units in the new data portion 415 against the current container index 160. For example, the storage controller 110 can generate a fingerprint for each data unit of the new data portion 415, and then compare the generated fingerprint to the fingerprints included in the current container index 160. If a match is identified, then the storage controller 110 determines that a duplicate of the incoming data unit is already stored by the storage system 100. In response to this determination, the storage controller 110 stores a reference to the previous data unit (e.g., in a manifest 150) in deduplicated form, rather than storing a new copy of the incoming data unit.

Figure 6:
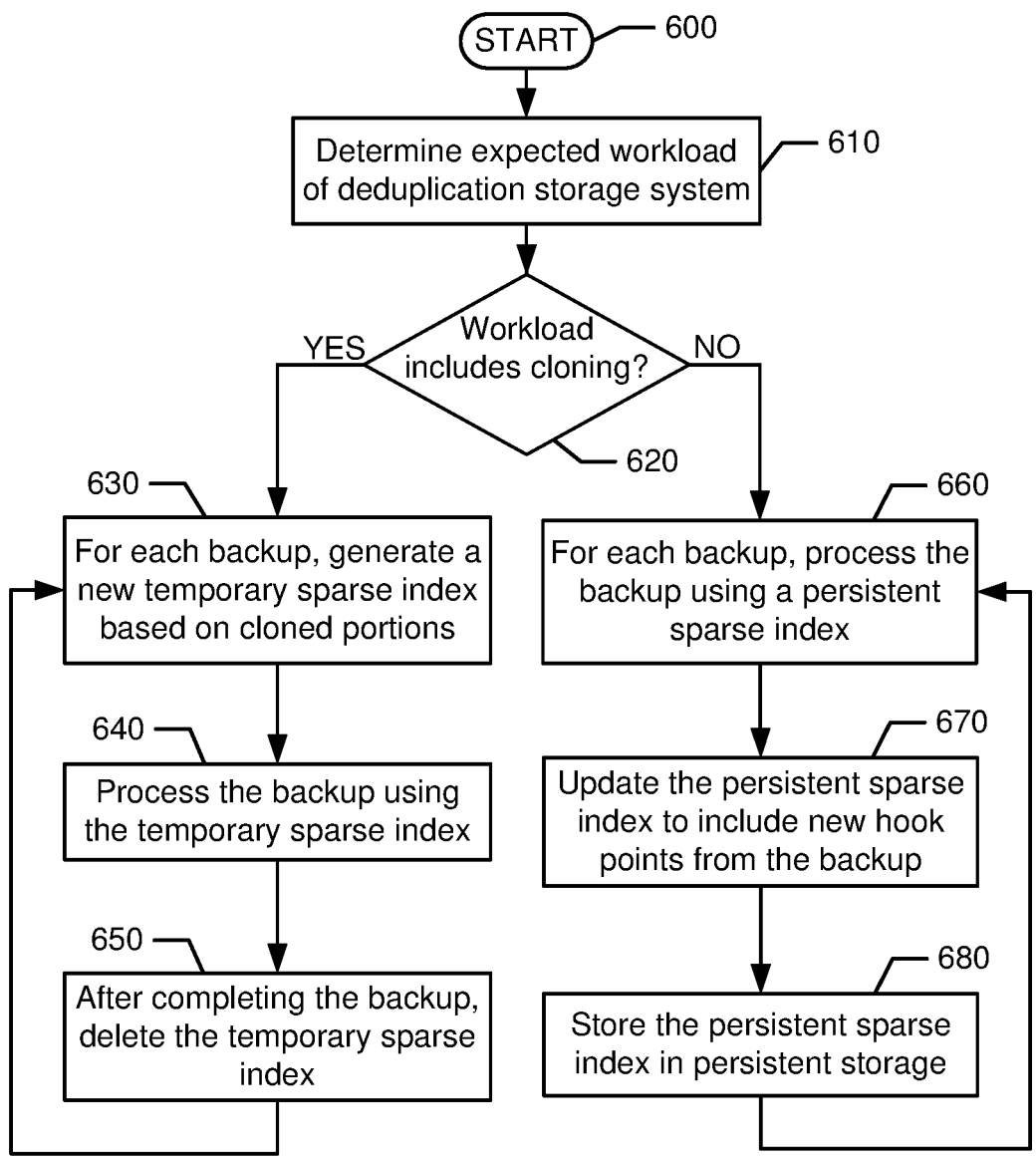
FIG. 6 is an illustration of an example process, in accordance with some implementations.

FIG. 6—Example Process for Data Deduplication

FIG. 6 shows is an example process 600 for data deduplication, in accordance with some implementations. In particular, the process 600 may include selecting between using a single persistent sparse index or multiple temporary sparse indexes. In some examples, the process 600 may be performed using the storage controller 110 (shown in FIG. 1). The process 600 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 600 may be described below with reference to FIGS. 1-4, which show examples in accordance with some implementations. However, other implementations are also possible.

Block 610 may include determining the expected workload of a deduplication storage system. Decision block 620 may include determining whether the expected workload includes cloning of data. For example, referring to FIG. 1, the storage controller 110 determines whether the expected workload of the deduplication storage system 100 is specified as including the cloning of data. In some implementations, this determination may be based on a configuration setting that specifies whether the expected workload includes cloning of data. However, other implementations are possible. For example, the type of expected workload may be specified by a user command, a program variable, an algorithmic evaluation of the workload history of the system, and so forth.

If it is determined at decision block 620 that the expected workload includes cloning of data ("YES"), the process 600 may continue at block 630, including, for each backup, generating a new temporary sparse index based on cloned portions. Block 640 may include processing the backup using the temporary sparse index. Block 650 may include, after completing the backup, delete the temporary sparse index. After block 650, the process 600 may return to block 630 (i.e., to process another backup).

However, if it is determined at decision block 620 that the expected workload does not include cloning of data ("NO"), the process 600 may continue at block 660, including, for each backup, processing the backup using a persistent sparse index. Block 670 may include updating the persistent sparse index to include new hook points from the backup. Block 680 may include storing the persistent sparse index in persistent storage. After block 680, the process 600 may return to block 660 (i.e., to process another backup).

Figure 7:
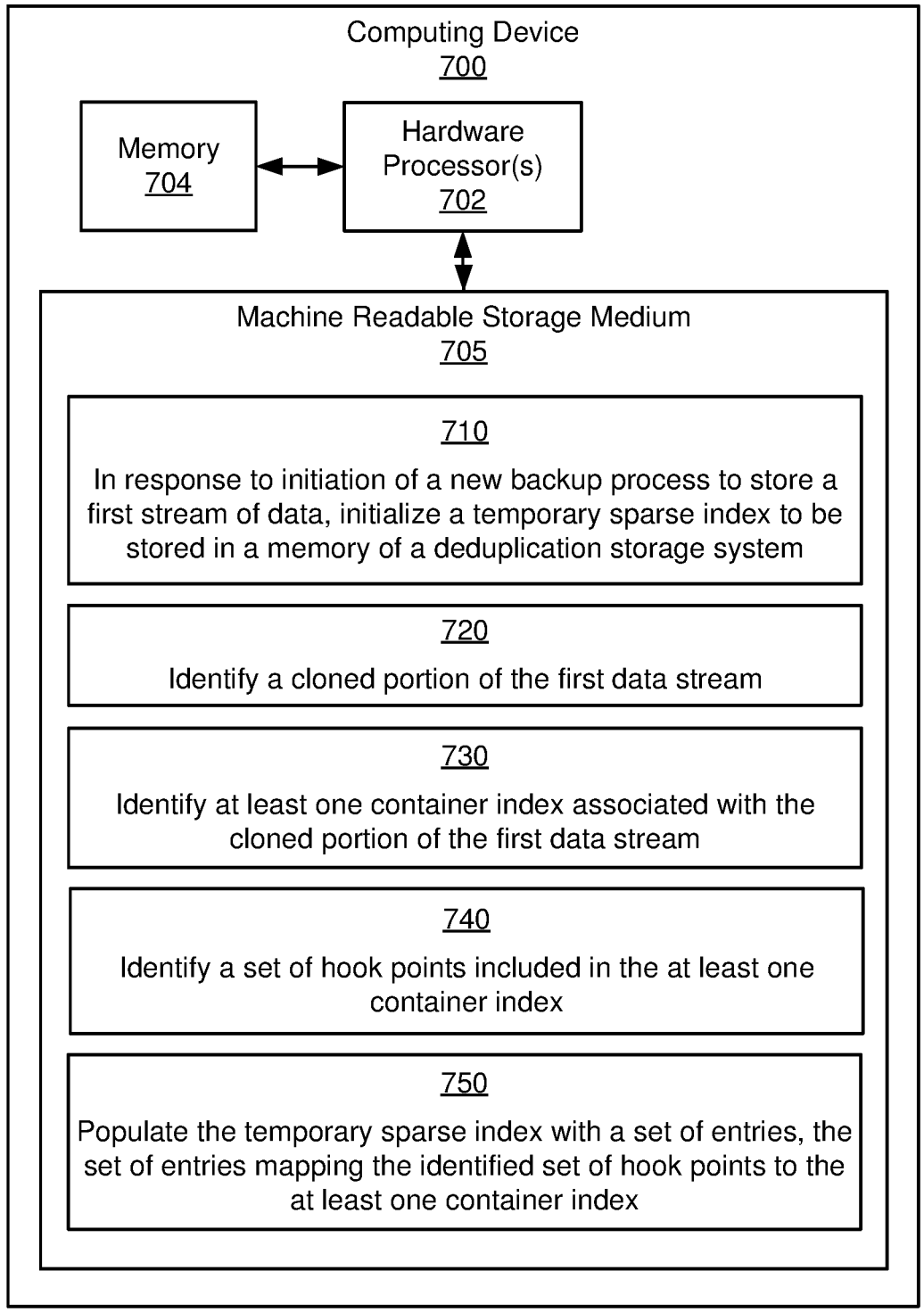
FIG. 7 is a schematic diagram of an example computing device, in accordance with some implementations.

FIG. 7—Example Computing Device

FIG. 7 shows a schematic diagram of an example computing device 700. In some examples, the computing device 700 may correspond generally to some or all of the storage system 100 (shown in FIG. 1). As shown, the computing device 700 may include a hardware processor 702, a memory 704, and machine-readable storage 705 including instructions 710-740. The machine-readable storage 705 may be a non-transitory medium. The instructions 710-740 may be executed by the hardware processor 702, or by a processing engine included in hardware processor 702.

Instruction 710 may be executed to, in response to initiation of a new backup process to store a first stream of data, initialize a temporary sparse index to be stored in a memory of a deduplication storage system. Instruction 720 may be executed to identify a cloned portion of the first data stream. Instruction 730 may be executed to identify at least one container index associated with the cloned portion of the first data stream. Instruction 740 may be executed to identify a set of hook points included in the at least one container index. Instruction 750 may be executed to populate the temporary sparse index with a set of entries, the set of entries mapping the identified set of hook points to the at least one container index.

For example, referring to FIGS. 1 and 4, the storage controller 110 receives information for a new backup from the client application 102, and in response initializes the temporary sparse index 180 to be used for processing the new backup. The storage controller 110 generates a first set of fingerprints for the data units included in a first cloned portion 410A, identifies hook points included in the first set of fingerprints, and identifies a first container index 160A that includes the identified hook points. Further, the storage controller 110 identifies hook points 420A from the first container index 160A, and populates the temporary sparse index 180 with entries that map the hook points 420A to the first container index 160A. In some implementations, the storage controller 110 may use the temporary sparse index 180 to generate a candidate list 190 that lists candidate container indexes, and may perform matching operations of new data units against the candidate container indexes according to the order of the candidate list 190.

Figure 8:
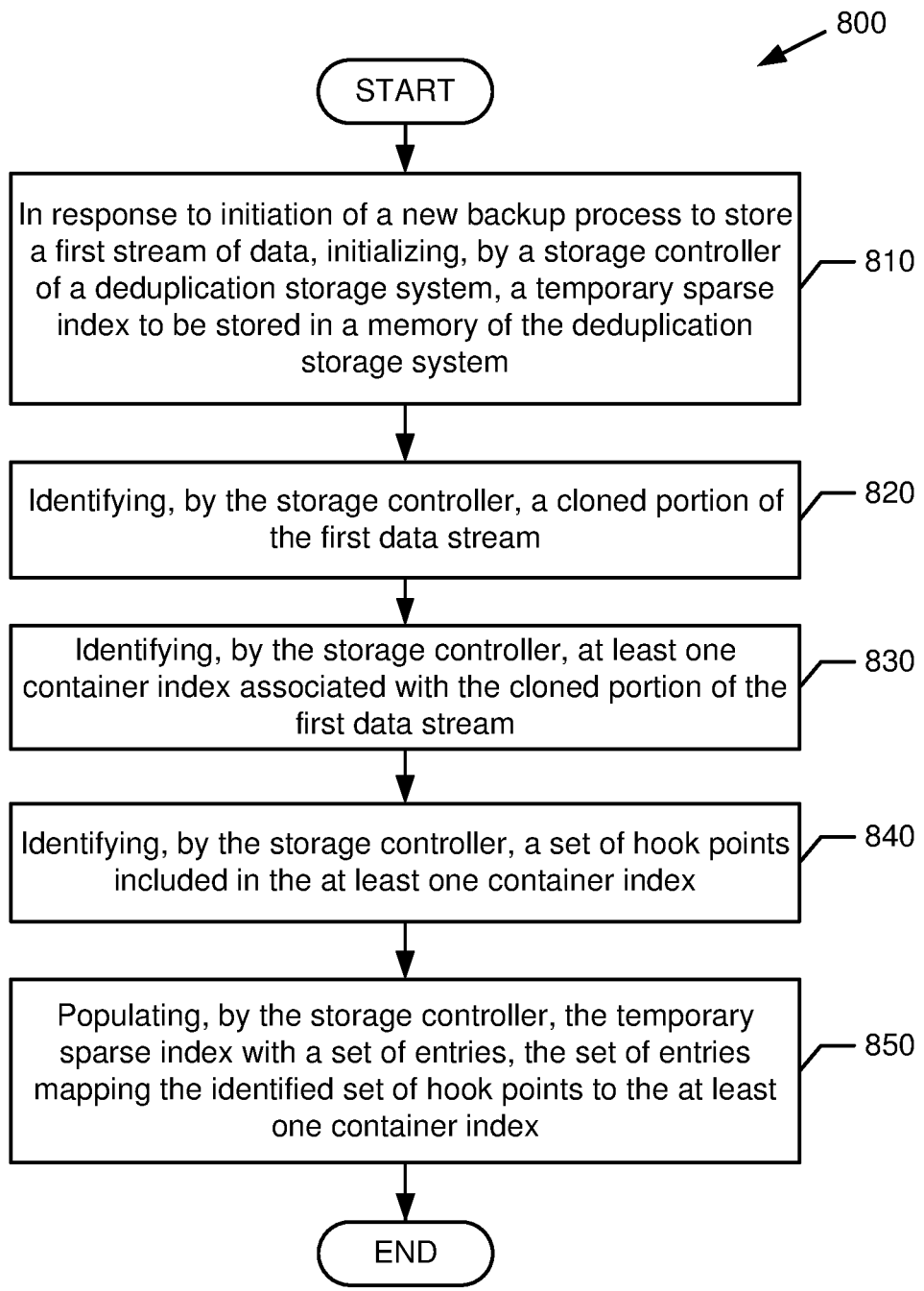
FIG. 8 is an illustration of an example process, in accordance with some implementations.

FIG. 8—Example Process

Referring now to FIG. 8, shown is an example process 800 in accordance with some implementations. In some examples, the process 800 may be performed using the storage controller 110 (shown in FIG. 1). The process 800 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 800 may be described below with reference to FIGS. 1-3, which show examples in accordance with some implementations. However, other implementations are also possible.

Block 810 may include, in response to initiation of a new backup process to store a first stream of data, initializing, by a storage controller of a deduplication storage system, a temporary sparse index to be stored in a memory of the deduplication storage system. Block 820 may include identifying, by the storage controller, a cloned portion of the first data stream. Block 830 may include identifying, by the storage controller, at least one container index associated with the cloned portion of the first data stream. Block 840 may include identifying, by the storage controller, a set of hook points included in the at least one container index. Block 850 may include populating, by the storage controller, the temporary sparse index with a set of entries, the set of entries mapping the identified set of hook points to the at least one container index. After block 850, the process 800 may be completed.

Figure 9:
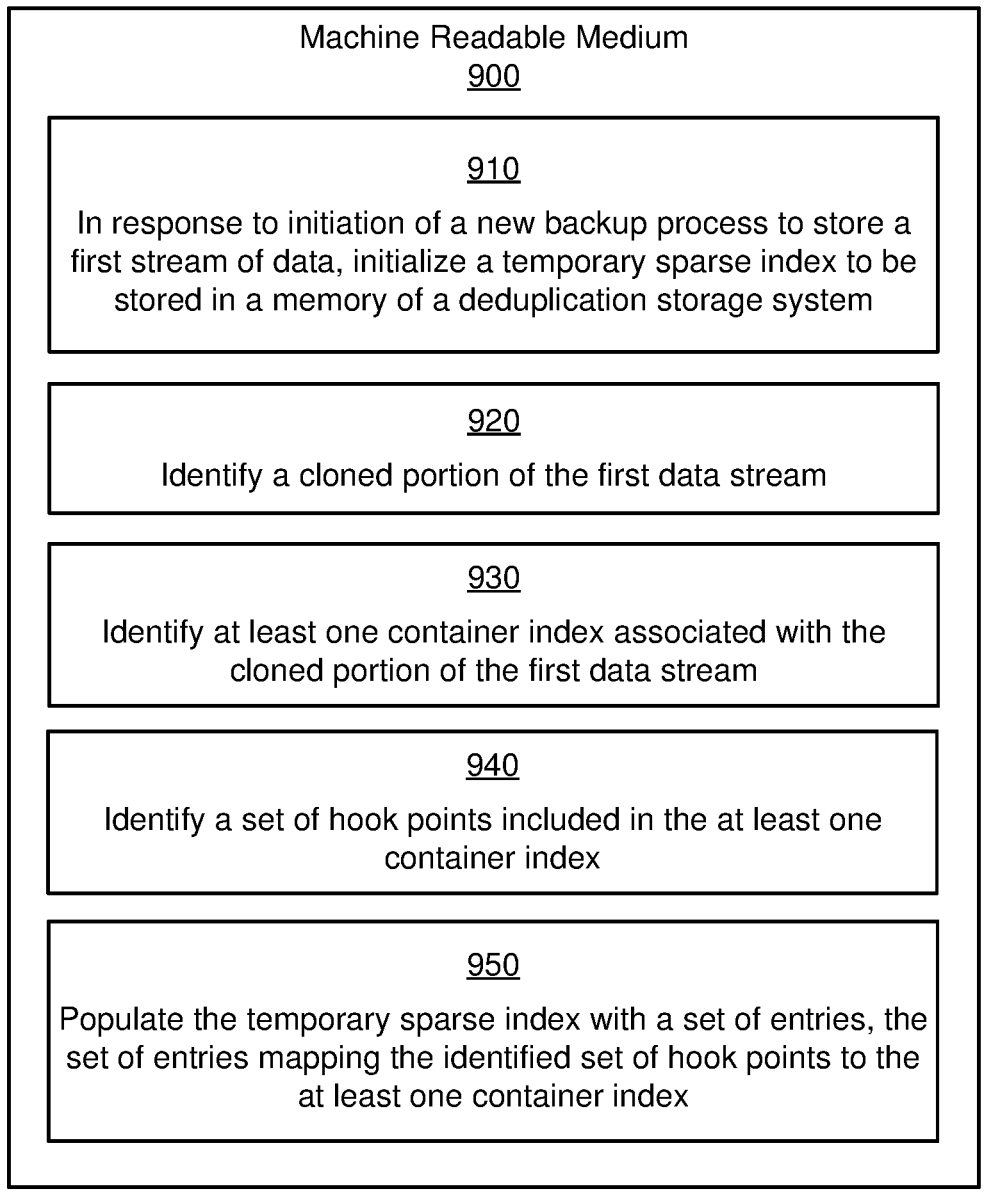
FIG. 9 is a diagram of an example machine-readable medium storing instructions in accordance with some implementations.

FIG. 9—Example Machine-Readable Medium

FIG. 9 shows a machine-readable medium 900 storing instructions 910-950, in accordance with some implementations. The instructions 910-950 can be executed by a single processor, multiple processors, a single processing engine, multiple processing engines, and so forth. The machine-readable medium 900 may be a non-transitory storage medium, such as an optical, semiconductor, or magnetic storage medium.

Instruction 910 may be executed to, in response to initiation of a new backup process to store a first stream of data, initialize a temporary sparse index to be stored in a memory of a deduplication storage system. Instruction 920 may be executed to identify a cloned portion of the first data stream. Instruction 930 may be executed to identify at least one container index associated with the cloned portion of the first data stream. Instruction 940 may be executed to identify a set of hook points included in the at least one container index. Instruction 950 may be executed to populate the temporary sparse index with a set of entries, the set of entries mapping the identified set of hook points to the at least one container index.

In accordance with implementations described herein, a deduplication storage system may generate a temporary sparse index for use by a single backup process. The temporary sparse index may be populated with a set of entries that map a set of hook points to at least one container index. The temporary sparse index may be used to generate a candidate list of container indexes to match against the new data portions of the backup data stream. Further, the temporary sparse index may be deleted when the processing of the backup data stream is completed. In this manner, some implementations may allow the deduplication storage system to use multiple temporary sparse indexes of relatively smaller sizes, instead of using a single persistent sparse index of a relatively large size. Accordingly, some implementations may reduce the amount of memory required to load a sparse index to generate a candidate list, and may thereby improve the performance of the deduplication storage system.

Note that, while FIGS. 1-8 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A storage system comprising:
   a processor;
   a memory; and
   a machine-readable storage storing instructions, the instructions executable by the processor to:
   in response to initiation of a new backup process to store a first stream of data, initialize a temporary sparse index to be stored in a memory of a deduplication storage system;
   identify a cloned portion of the first data stream;
   identify at least one container index associated with the cloned portion of the first data stream;
   identify a set of hook points included in the at least one container index; and
   populate the temporary sparse index with a set of entries, the set of entries mapping the identified set of hook points to the at least one container index.

2. The storage system of claim 1, including instructions executable by the processor to:
generate a first set of fingerprints for data units included in the cloned portion;
identify one or more hook points included in the first set of fingerprints; and
identify the at least one container index that includes the one or more hook points.

3. The storage system of claim 1, including instructions executable by the processor to:
receive a new data portion of the first data stream;
identify a second set of hook points in the new data portion based on a sparse fingerprint condition;
identify a set of candidate container indexes based on a comparison of the second set of hook points to the temporary sparse index;
order the set of candidate container indexes in decreasing number of matching hook points; and
generate a candidate list from the ordered set of candidate container indexes.

4. The storage system of claim 3, including instructions executable by the processor to:
perform matching operations of data units in the new data portion against the set of candidate container indexes according to the order of the candidate list.

5. The storage system of claim 1, including instructions executable by the processor to:
delete the temporary sparse index in response to a completion of the new backup process.

6. The storage system of claim 1, wherein the temporary sparse index comprises all hook points included in the at least one container index.

7. The storage system of claim 1, wherein the temporary sparse index comprises only a subset of hook points in the at least one container index that are also included in the cloned portion.

8. The storage system of claim 1, including instructions executable by the processor to:
determine whether an expected workload includes cloning of data;
use the temporary sparse index in response to a determination that the expected workload includes cloning of data; and
use a persistent sparse index in response to a determination that the expected workload does not includes cloning of data.

9. The storage system of claim 1, wherein the instructions to identify the cloned portion of the first data stream comprise instructions to receive a cloning command from a first client application, wherein the first client application is included in a plurality of client applications, wherein the plurality of client applications are associated with a plurality of backup processes, and wherein each of the plurality of plurality of backup processes is to use a different temporary sparse index.

10. A method comprising:
in response to initiation of a new backup process to store a first stream of data, initializing, by a storage controller of a deduplication storage system, a temporary sparse index to be stored in a memory of the deduplication storage system;
identifying, by the storage controller, a cloned portion of the first data stream;
identifying, by the storage controller, at least one container index associated with the cloned portion of the first data stream;
identifying, by the storage controller, a set of hook points included in the at least one container index; and
populating, by the storage controller, the temporary sparse index with a set of entries, the set of entries mapping the identified set of hook points to the at least one container index.

11. The method of claim 10, further comprising:
generating a first set of fingerprints for data units included in the cloned portion;
identifying one or more hook points included in the first set of fingerprints; and
identifying the at least one container index that includes the one or more hook points.

12. The method of claim 10, further comprising:
receiving a new data portion of the first data stream;
identifying a second set of hook points in the new data portion based on a sparse fingerprint condition;
identifying a set of candidate container indexes based on a comparison of the second set of hook points to the temporary sparse index;
ordering the set of candidate container indexes in decreasing number of matching hook points;
generating a candidate list from the ordered set of candidate container indexes; and
performing matching operations of data units in the new data portion against the set of candidate container indexes according to the order of the candidate list.

13. The method of claim 10, further comprising:
deleting the temporary sparse index in response to a completion of the new backup process.

14. The method of claim 10, wherein the temporary sparse index comprises all hook points included in the at least one container index.

15. The method of claim 10, further comprising:
determining whether an expected workload includes cloning of data;
using the temporary sparse index in response to a determination that the expected workload includes cloning of data; and
using a persistent sparse index in response to a determination that the expected workload does not includes cloning of data.

16. A non-transitory machine-readable medium storing instructions that upon execution cause a processor to:
in response to initiation of a new backup process to store a first stream of data, initialize a temporary sparse index to be stored in a memory of a deduplication storage system;
identify a cloned portion of the first data stream;
identify at least one container index associated with the cloned portion of the first data stream;
identify a set of hook points included in the at least one container index; and
populate the temporary sparse index with a set of entries, the set of entries mapping the identified set of hook points to the at least one container index.

17. The non-transitory machine-readable medium of claim 16, including instructions that upon execution cause the processor to:
generate a first set of fingerprints for data units included in the cloned portion;
identify one or more hook points included in the first set of fingerprints; and
identify the at least one container index that includes the one or more hook points.

18. The non-transitory machine-readable medium of claim 16, including instructions that upon execution cause the processor to:
- receive a new data portion of the first data stream;
- identify a second set of hook points in the new data portion based on a sparse fingerprint condition;
- identify a set of candidate container indexes based on a comparison of the second set of hook points to the temporary sparse index;
- order the set of candidate container indexes in decreasing number of matching hook points;
- generate a candidate list from the ordered set of candidate container indexes; and
- perform matching operations of data units in the new data portion against the set of candidate container indexes according to the order of the candidate list.

19. The non-transitory machine-readable medium of claim 16, including instructions that upon execution cause the processor to:
- delete the temporary sparse index in response to a completion of the new backup process.

20. The non-transitory machine-readable medium of claim 16, including instructions that upon execution cause the processor to:
- determine whether an expected workload includes cloning of data;
- use the temporary sparse index in response to a determination that the expected workload includes cloning of data; and
- use a persistent sparse index in response to a determination that the expected workload does not includes cloning of data.

* * * * *